United States Patent
Oh et al.

(10) Patent No.: US 8,638,739 B2
(45) Date of Patent: Jan. 28, 2014

(54) METHOD FOR TRANSMITTING FRAME TO MULTI-USER IN WIRELESS COMMUNICATIONS SYSTEMS USING PLURALITY SEGMENT FREQUENCY BANDS AND METHOD FOR RECEIVING THE FRAME

(75) Inventors: Jong-Ee Oh, Daejeon (KR); Sok-Kyu Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 99 days.

(21) Appl. No.: 13/104,630

(22) Filed: May 10, 2011

(65) Prior Publication Data

US 2011/0274065 A1 Nov. 10, 2011

(30) Foreign Application Priority Data

May 10, 2010 (KR) .................. 10-2010-0043554

(51) Int. Cl.
*H04W 4/00* (2009.01)
(52) U.S. Cl.
USPC ........................................... 370/329
(58) Field of Classification Search
None
See application file for complete search history.

(56) References Cited

U.S. PATENT DOCUMENTS

| | | | |
|---|---|---|---|
| 2004/0076127 A1* | 4/2004 | Porte | 370/328 |
| 2005/0037763 A1* | 2/2005 | Hamamoto et al. | 455/447 |
| 2006/0189321 A1* | 8/2006 | Oh et al. | 455/452.2 |
| 2006/0205412 A1* | 9/2006 | Oh et al. | 455/450 |
| 2006/0234704 A1* | 10/2006 | Lee et al. | 455/434 |
| 2007/0060178 A1* | 3/2007 | Gorokhov et al. | 455/506 |
| 2008/0227475 A1* | 9/2008 | Suemitsu et al. | 455/513 |
| 2010/0040036 A1* | 2/2010 | Ofuji et al. | 370/344 |
| 2010/0260081 A1* | 10/2010 | Damnjanovic et al. | 370/281 |
| 2011/0070911 A1* | 3/2011 | Zhang et al. | 455/509 |
| 2012/0282922 A1* | 11/2012 | Fodor et al. | 455/426.1 |
| 2013/0003669 A1* | 1/2013 | Ohara et al. | 370/329 |

OTHER PUBLICATIONS

Youhan Kim et al., "160 MHz PHY Transmission", IEEE 802.11-10/0378r0, Mar. 17, 2010.

* cited by examiner

*Primary Examiner* — Otis L Thompson, Jr.

(57) ABSTRACT

Provided is a method for transmitting data frames to multiple STAs in a wireless communication system which divides a frequency band into frequency band segments to allocate. The method includes: setting a group by grouping a plurality of STAs; determining whether or not to separately allocate the frequency band segments to the STAs within the group; constructing a control frame containing a segment field, based on the determination result; and transmitting the constructed control frame through a common signal, and transmitting data frames.

12 Claims, 8 Drawing Sheets

METHOD FOR TRANSMITTING FRAME TO MULTI-USER IN WIRELESS COMMUNICATIONS SYSTEMS USING PLURALITY SEGMENT FREQUENCY BANDS AND METHOD FOR RECEIVING THE FRAME

CROSS-REFERENCE TO RELATED APPLICATIONS

The present application claims priority of Korean Patent Application No. 10-2010-0043554, filed on May 10, 2010, which is incorporated herein by reference in its entirety.

BACKGROUND OF THE INVENTION

1. Field of the Invention

Exemplary embodiments of the present invention relate to a technology for transmitting frames to multiple users in a wireless communication system; and, more particularly, to a method for transmitting frames to multiple users while efficiently using an available frequency band as much as possible, in a wireless communication system using a plurality of frequency band segments, and a method for receiving frames.

2. Description of Related Art

In general, a wireless communication system such as a wireless LAN (WLAN) system includes a plurality of access points (AP) which are connected to one another through a network. A plurality of stations (STAs) existing within a basic service set (BSS) managed by one AP simultaneously transmit/receive frames to and from the AP. Meanwhile, an independent BSS (IBSS) includes a plurality of STAs, and one STA transmits/receives a frame at the same time as the other STAs.

A wireless communication system using multiple antennas may acquire an increase in channel capacity according to an increase in the number of antennas.

Accordingly, since the wireless communication system using multiple antennas may increase frequency efficiency, the wireless communication system has been recently adopted in various standards.

Recently, much attention has been paid to not only multiple input multiple output (MIMO) technology for transmitting multiple streams to only one user, but also multi-user MIMO (MU-MIMO) technology for transmitting multiple streams to multiple users.

The MU-MIMO technology, in which an AP eliminates interference between a plurality of STAs and transmits data, may acquire a MU diversity gain as well as an increase in channel capacity of multiple antennas. The MU-MIMO technology may simultaneously transmit multiple streams to multiple users by using the same frequency band. Therefore, the MU-MIMO technology may efficiently increase throughput while increasing the complexity of the AP.

A conventional method for increasing throughput is to increase a frequency band. Such a conventional method uses a large number of expensive and limited frequency bands, but is simpler than the MU-MIMO technology which increases the complexity of an AP without increasing the frequency band. For this reason, a variety of methods which employ the MU-MIMO technology while using variable frequency bands depending on the surrounding conditions have been discussed in recent standards such as the IEEE 802.11ac.

In a wireless communication system which simultaneously transmits multiple antenna streams to a plurality of users while using variable frequency bands, a plurality of frequency band segments may exist. However, when STAs supporting all frequency band segments and STAs supporting only some frequency band segments are mixed in such a wireless communication system which supports the plurality of frequency band segments, an available frequency band may not be utilized as much as possible but be wasted, depending on the frequency band segments of the STAs. For example, a case in which STAs supporting only one 80 MHz band and STAs supporting two 80 MHz bands are mixed may be considered in a wireless communication system which uses an 80 MHz frequency band as one segment. In this case, although an AP secures an available frequency band of 160 MHz, a frequency band of 80 MHz may not be used when the AP communicates with an STA supporting the 80 MHz frequency band, and thus the frequency resource may be wasted.

SUMMARY OF THE INVENTION

An embodiment of the present invention is directed to a method for transmitting frames to multiple STAs while efficiently using an available frequency band even when STAs supporting all frequency band segments and STAs supporting only some frequency band segments are mixed, in a wireless communication system using a plurality of frequency band segments, and a method for receiving data frames transmitted in such a manner.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, there is provided a method for transmitting data frames to multiple STAs in a wireless communication system which divides a frequency band into frequency band segments to allocate. The method includes: setting a group by grouping a plurality of STAs; determining whether or not to separately allocate the frequency band segments to the STAs within the group; constructing a control frame containing a segment field, based on the determination result; and transmitting the constructed control frame through a common signal, and transmitting data frames.

In accordance with another embodiment of the present invention, there is provided a method for transmitting data frames to multiple STAs in a wireless communication system which divides a frequency band into frequency band segments to allocate. The method includes: setting bits of a segment field which indicate information of the frequency band segments allocated to the respective STAs forming a group, and constructing a control frame containing the segment field; and transmitting the constructed control frame through a common signal, and transmitting data frames.

The control frame may include: the segment field for indicating whether all the STAs within the group use all the segments or the frequency band segments are separately allocated to the STAs within the group; a group ID corresponding to the group information; and a stream number indication field for indicating the numbers of transport streams allocated to the respective STAs within the group.

The segment field may have bits corresponding to the order of the STAs within the group. When all the frequency band segments are allocated to all the STAs within the group, all the bits of the segment field may be set to a first value, and when the frequency band segments are separately allocated to the STAs within the group, at least one bit of the segment field may be set to a second value different from the first value.

In accordance with another embodiment of the present invention, there is provided a method for receiving data frames transmitted to multiple STAs in a wireless communication system which divides a frequency band into frequency band segments to allocate. The method includes: receiving, by each of the STAs, group information, and receiving a common signal; checking whether a data frame is a signal transmitted to a group of the STA through a group ID of the received common signal; when the data frame is a signal transmitted to the group of the STA, checking a frequency band segment allocated to each of the STAs within the group by using information of a segment field contained in the common signal; and receiving a transmitted data frame through the checked frequency band segment.

When the data frame is a signal transmitted to the group of the STA, whether or not the data frame is a signal of which the destination was to the STA may be determined by using bit information of the segment field for indicating segments allocated to the STAS within the group for the frequency band segments contained in the common signal and bit information of a stream number indication field for indicating the numbers of transport streams allocated to the respective STAs within the group.

DESCRIPTION OF SPECIFIC EMBODIMENTS

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

In the IEEE 802.11ac standard which has been recently discussed, an 80 MHz frequency band is mandatorily supported by STAs, and a 160 MHz frequency band is optionally supported by STAs. Furthermore, when the MU-MIMO technology is used, all STAs should use the 80 MHz frequency band or 160 MHz frequency band. That is, the IEEE 802.11ac standard allows an STA to uses only one 80 MHz frequency band segment or two 80 MHz frequency band segments, but does not allow an STA to use both of one 80 MHz frequency band segment and two 80 MHz frequency band segments.

Exemplary embodiments of the present invention provide a method in which an STA supporting a 160 MHz frequency band and an STA supporting an 80 MHz frequency band may use the entire available 160 MHz frequency band. The embodiments of the present invention are implemented by informing each STA of segment information through a signal field.

Figure 1:
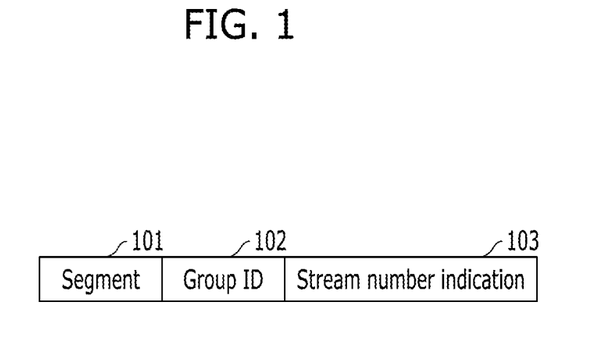
FIG. 1 is a diagram showing the format of a control frame transmitted through a common signal field in accordance with an embodiment of the present invention.

FIG. 1 is a diagram showing the format of a control frame contained in a common signal field in accordance with an embodiment of the present invention.

Referring to FIG. 1, a segment field 101 is added to the control frame to acknowledge frequency band segments which are to be used by STAs forming a group.

Referring to FIG. 1, the control frame format in accordance with the embodiment of the present invention includes the segment field 101, a group ID field 102, and a stream number indication field 103.

The segment field 101 serves to acknowledge a frequency band segment which is to be used by each of the STAs forming a group, among a plurality of frequency band segments. For example, in the case of a MIMO system having two frequency band segments of 80 MHz, the segment field 101 indicates whether to use only an 80 MHz band corresponding to one frequency band segment or a 160 MHz band corresponding to two frequency band segments, according to the ability of the STAs forming the group, the wireless environment, and transmission data requirements.

The IEEE 802.11ac standard has adopted a technology which forms a plurality of groups by mapping a plurality of STAs within an AP into the plurality of groups through information such as channel characteristics, in order to use the MIMO technology and increase the efficiency of an information transmission method. The group ID field 102 serves to indicate the grouping information of a plurality of STAs belonging to the AP.

The stream number indication field 103 serves to indicate the numbers of streams which are to be used by STAs forming a group.

For further understanding of the group ID field and the stream number indication field, a data transmission process in a wireless communication system will be briefly described as follows.

The AP transmits information required for a plurality of STAs to transmit channel sounding/feedback or receive data, through a control information frame. In other words, the AP uses the control information frame to request the plurality of STAs to transmit channel sounding/feedback.

The respective STAs receiving the control information frame from the AP transmit channel information to the AP in response to the channel sounding/feedback request.

The AP receiving the channel information from the respective STAs decides the number of STAs to which the AP may transmit data frames at the same time and the numbers of streams for the respective STAs, in consideration of the correlation between channels and/or the quality of service (QoS) of data. Furthermore, the AP transmits data frames for the respective STAs with the decided information on the number of STAs to which the AP may transmit data frames at the same time. Here, the AP transmits the information on the number of STAs to which the AP may transmit data frames at the same time and the information on the transport stream numbers for the respective STAs, through a common signal which may be received by all the STAs.

The STAs receiving data frames demodulate the received data frames by using the information on the number of STAs to which the AP may transmit data frames at the same time and the information on the transport stream numbers for the respective STAs, which are contained in the common signal transmitted from the AP. Furthermore, the respective STAs check whether or not an error occurred in the received data, and transmits an ACK frame indicating the check result to the AP.

When the AP transmits frames to the plurality of STAs at the same time, the transmission may be referred to as multi-user transmission. In order to perform such a multi-user transmission, the AP maps the plurality of STAs existing within the region of the AP into a plurality of groups, based on channel characteristics or QoS. The information on the groups formed in such a manner, for example, a group ID is transmitted to the respective STAs through the control information frame at the media access control (MAC) layer.

Such a group ID is used to specify K STAs in a specific order, where K is an arbitrary natural number (for example, K≤4). The group ID is defined by the AP and then transmitted to the STAs. One STA may receive a plurality of group IDs. That is, one STA may belong to a single group or a plurality of groups.

The AP uses a group definition field to inform each STA of the group ID information. The group definition field includes information on STAs belonging to one group ID and the order of the STAs. Accordingly, when receiving the group definition field, each of the STAs may recognize the group ID of a group to which the STA belongs and the order of the STA within the group.

Since the stream number of each STA in each group is required for demodulating a long term training (LTF) field for channel estimation, the stream number indication field 103 serves to indicate the number of transport streams allocated to each STA within the group. The information contained in the stream indication field 103 may be defined in various manners to optimize the number of bits used for indicating the transport stream number.

Such a frame transmission method in accordance with the embodiment of the present invention will be described in detail with reference to the accompanying drawings.

In the following descriptions, the frequency band has two frequency band segments of 80 MHz, one frequency band segment of 80 MHz which is mandatorily supported by all STAs is referred to as a primary segment, and the other frequency band segment of 80 MHz which is optically supported depending on STAs is referred to as a secondary segment. Therefore, when only one segment is used, the STAs use an 80 MHz frequency band, and when two segments are used, the STAs use a 160 MHz frequency band. However, such a configuration is only an example. The frequency band may consist of two or more frequency band segments, which is obvious to those skilled in the art. Therefore, the embodiments of the present invention may include such a configuration that the frequency band consists of two or more frequency band segments.

Figure 2A:
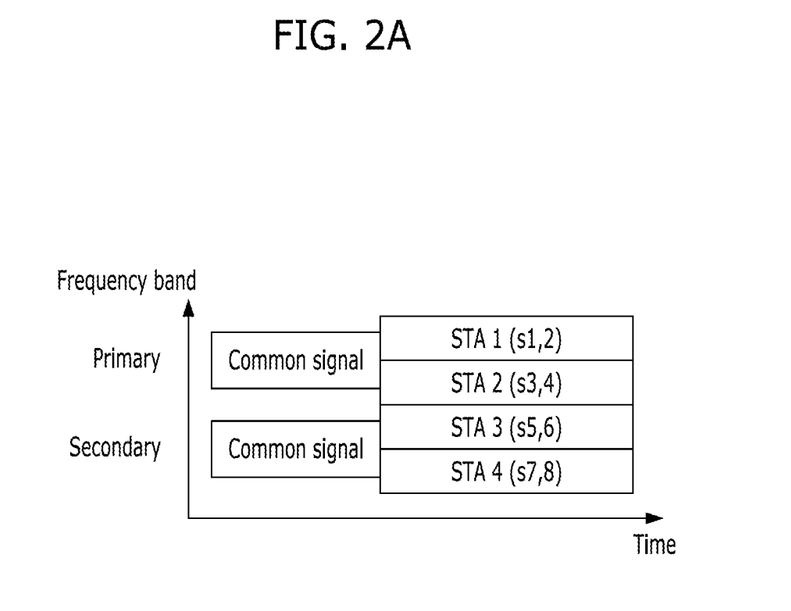
FIG. 2A shows a case in which STAs within a group transmit frames through the MU-MIMO method by using both of primary and secondary segments, in accordance with the embodiments of the present invention.
Figure 3A:
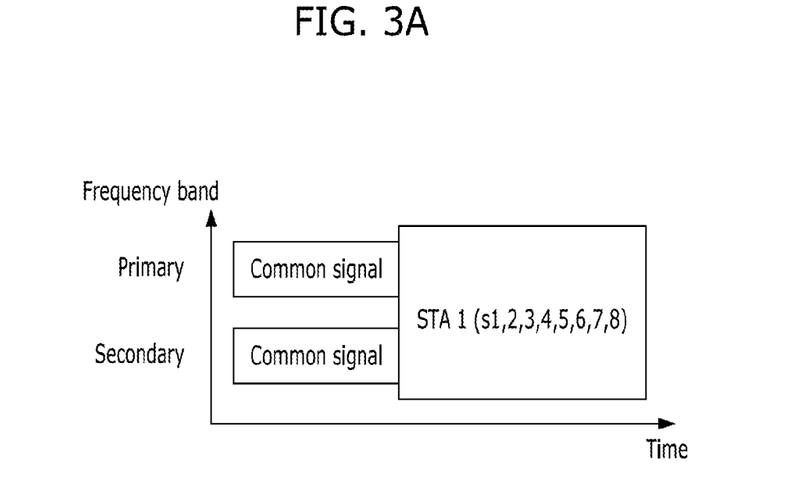
FIG. 3A shows a case in which one STA uses both of the primary and secondary segments to transmit a frame through the SU-MIMO method, in accordance with the embodiment of the present invention.
Figure 4A:
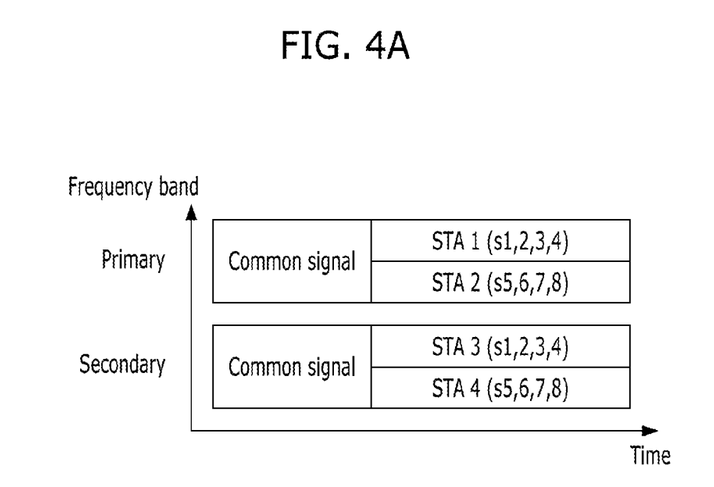
FIG. 4A is a diagram explaining an example in which frequency band segments are separately allocated to transmit frames through the MU-MIMO method.
Figure 5A:
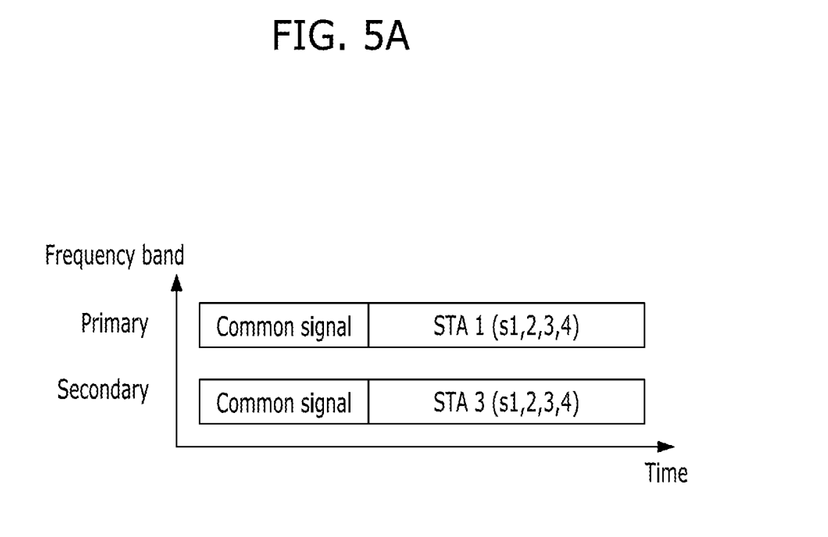
FIG. 5A is a diagram explaining a first example in which frequency band segments are separately allocated to transmit a frame through the SU-MIMO method.

The embodiments of the present invention include a method in which all STAs use both of the primary and secondary segments or some STAs within a group use the primary segment and the other STAs within the group use the secondary segment. FIGS. 2A and 3A show an example in which all STAs use both of the primary and secondary segments. FIGS. 4A and 5A show an example in which the primary and secondary segments are separately used by the respective STAs.

First, the example in which all STAs forming a group use both of the primary and secondary segments will be described.

Figure 2B:
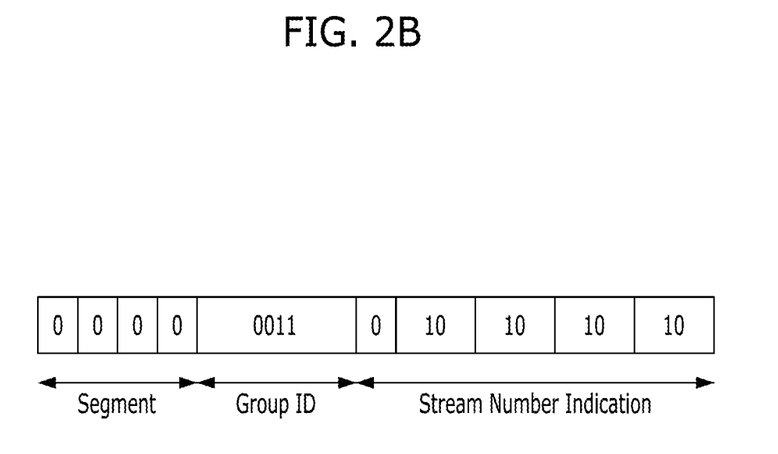
FIGS. 2B and 2C show the format of a control frame in the case of FIG. 2A.
Figure 2C:
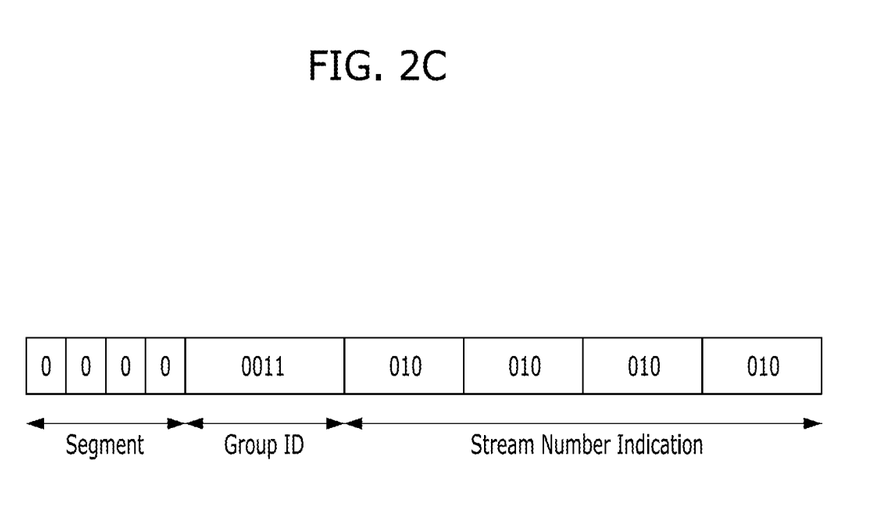

FIG. 2A shows a case in which STAs within a group transmit frames through the MU-MIMO method by using both of the primary and secondary segments, in accordance with the embodiments of the present invention. FIGS. 2B and 2C show the format of a control frame contained in common signal information when a frame is transmitted according to such a method as shown in FIG. 2A.

FIG. 2A shows a case in which one group consists of four STAs,.STA1 to STA4,. and the MU-MIMO technology is used to transmit frames when the maximum number of streams used by an AP is eight. In FIG. 2A, the STA STA1 uses transport streams S1 and S2, the STA STA2 uses transport streams S3 and S4, the STA STA3 uses transport streams S5 and S6, and the STA STA4 uses transport streams S7 and S8. Furthermore, all the STAs STA1 to STA4 receive data frames through the MU-MIMO method by using both of the primary and secondary segments.

In the embodiment of the present invention, the segment field information is represented by "0000" to indicate that all the STAs within the group transmit frames by using both of the primary and secondary segments.

Referring to FIGS. 2B and 2C, the segment field information is represented by "0000" to indicate that all the STAs within the group use both of the primary and secondary segments. Furthermore, a group ID indicating the grouping information of the respective STAs and stream number indication information indicating the transport stream numbers of the respective STAs within the group are contained in the common signal information.

Referring to FIGS. 2B and 2C, the group ID is represented by "0011", and the stream number indication field may be expressed in various manners. FIG. 2B shows that the stream number indication field is represented by 9 bits. In order to express the stream number indication field as 9 bits, one bit is used to indicate that all the STAs within the group use one or more transport streams. The one bit is set to '0'. Furthermore, eight bits are used to indicate the numbers of transport streams used by the four STAs, respectively, according to the order of the STAs. As shown in FIG. 2A, each STA within the group uses two transport streams. Therefore, in FIG. 2B, the eight bits are represented by "10101010". FIG. 2C shows an example in which 3 bits for the respective STAs, that is, total 12 bits are used to express the numbers of transport streams used by the STAs. As shown in FIG. 2A, since each STA uses two transport streams, the 12 bits of the stream number indication field are represented by "010010010010".

Figure 3B:
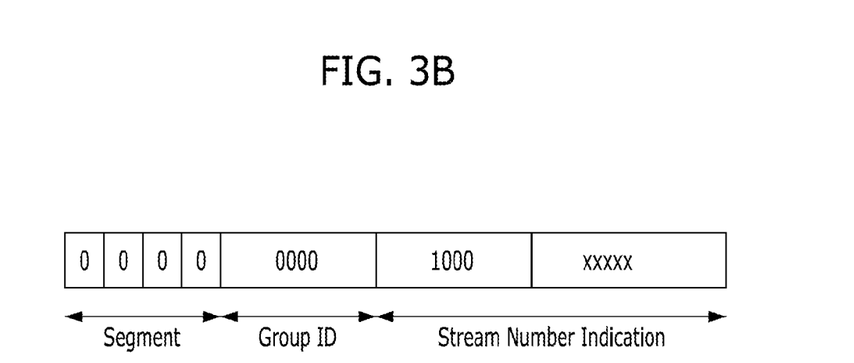
FIGS. 3B and 3C show the format of a control frame in the case of FIG. 3A.
Figure 3C:
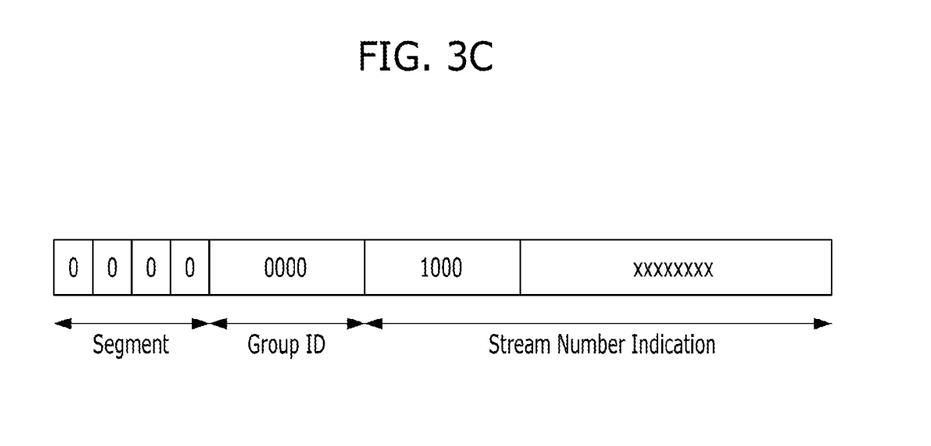

FIG. 3A shows a case in which one STA uses both of the primary and secondary segments to transmit a frame through the SU-MIMO method, in accordance with the embodiment of the present invention. FIGS. 3B and 3C show the format of a control frame contained in common signal information when the frame is transmitted by such a method as shown in FIG. 3A.

Referring to FIGS. 3B and 3C, "0000" is allocated to a segment field to indicate a case in which the STA uses both of the primary and secondary segments, like the case of FIGS. 2B and 2C. Furthermore, since the frame is transmitted through the SU-MIMO method where one STA uses all frequency bands, a group ID is set to "0000" to indicate that the SU-MIMO method is used. Furthermore, since the STA STA1 uses all the eight transport streams as shown in FIG. 3A, only information indicating the transport stream number of the STA STA1 in the stream indication field is represented by "1000".

Next, the case in which the primary and secondary segments are separately used by STAs will be described with reference to FIGS. 4A to 6B.

FIG. 4A shows a case in which one group consists of four STAs STA1 to STA4, the STAs STA1 and STA2 use the primary segment, and the STAs STA3 and STA4 use the secondary segment to transmit frames through the MU-MIMO method, when the maximum number of transport streams to be allocated by an AP is eight.

Figure 4B:
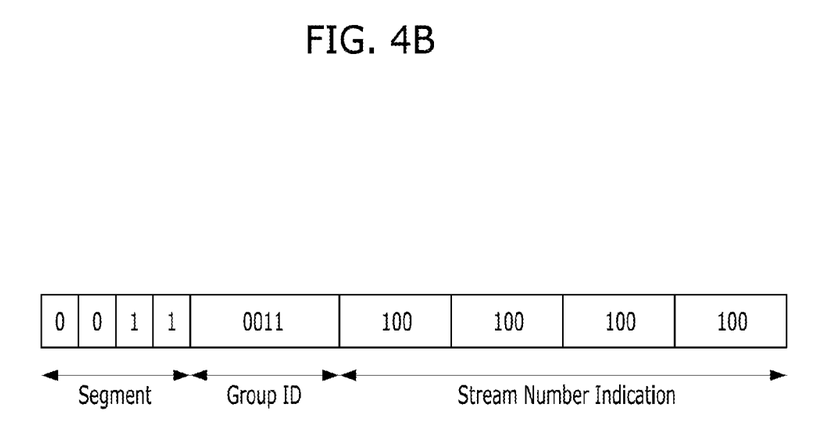
FIG. 4B shows the format of a control frame in the case of FIG. 4A.

Referring to FIG. 4B, first and second bits of a four-bit segment field are set to "0" to indicate that the STAs STA1 and STA2 use the primary segment, and third and fourth bits of the four-bit segment field are set to "1" to indicate that the STAs STA3 and STA4 use the secondary segment.

Based on the above-described format, the segment field in accordance with the embodiment of the present invention may be use as follows. The bit number of the segment field may be set to the same value as the number of STAs forming the group, and the order of the STAs forming the group may be set to coincide with the bit order. In the embodiment of the present invention, when the entire bit information of the segment field is set to "0", it means that all the STAs within the group use both of the primary and secondary segments, and when any one bit of the segment field is set to "1", it means that the primary and second segments are separately used for the respective STAs. Furthermore, when a segment bit corresponding to the order of an STA within the group is set to "0" in the case where the primary and second segments are separately allocated to the respective STAs, it may indicate that the STA use the primary segment, and when a segment bit corresponding to the order of an STA within the group is set to "1", it may indicate that the STA use the secondary segment.

Here, the STAs STA3 and STA4 using the secondary segment should be able to support both of the primary and secondary segments. In other words, STAs supporting only an N band may use only the primary segment, and STAs supporting a 2N band may use any one of the primary and secondary segments.

Referring to FIG. 4B, the segment field is set to "0011" to indicate that the STAs STA1 and STA2 use the primary segment and the STAs STA3 and STA4 use the secondary segment, and a group ID is set to "0011". A stream number indication field may be expressed in various manners. FIG. 4B shows a case in which three bits for each STA are used to express the stream number indication field as 12 bits. Since each STA uses four transport streams in FIG. 4A, the stream number indication field is represented by "100100100100".

In the embodiment of the present invention, an existing channel sounding method may be used as it is, and channel sounding may be adaptively transmitted depending on changes in the number of antennas and the frequency band.

Figure 5B:
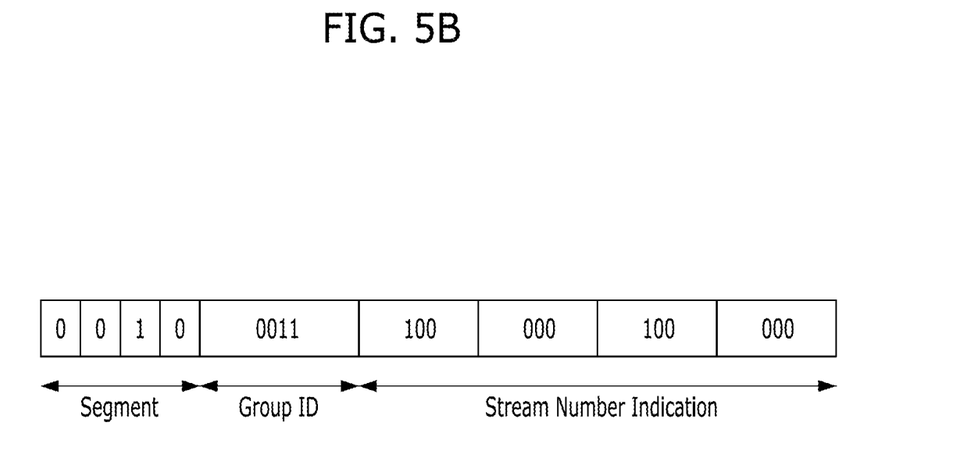
FIG. 5B shows the format of a control frame in the case of FIG. 5A.
Figure 6A:
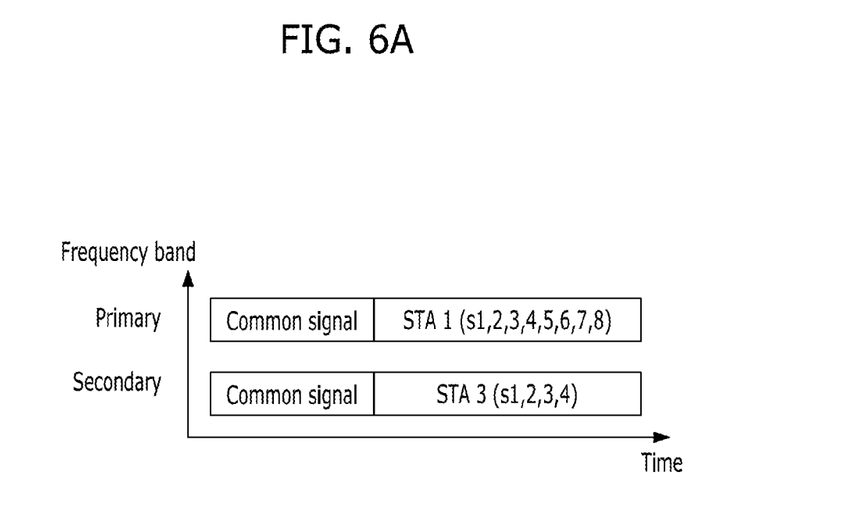
FIG. 6A is a diagram explaining a second example in which frequency band segments are separately allocated to transmit a frame through the SU-MIMO method.
Figure 6B:
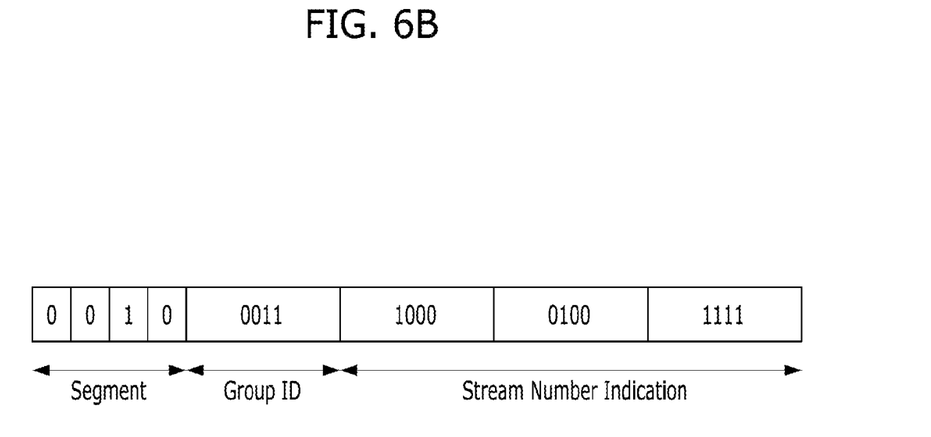
FIG. 6B shows the format of a control frame in the case of FIG. 6A.

FIGS. 5A and 6A show a case in which the primary and secondary segments in accordance with the embodiment of the present invention are used to transmit a frame through the SU-MIMO method. This case may be analyzed as the MIMO method or may be analyzed as parallelization of the SU-MIMO method. In this case, a group ID is allocated as a value which is not a group ID indicating the SU-MIMO. FIGS. 5B and 6B show a case in which "0011" is allocated to the group ID.

Referring to FIGS. 5A and 5B, the STA STA1 uses the primary segment, the STA STA3 uses the secondary segment, and the STAs STA1 and STA3 use four transport streams.

Referring to FIG. 5B, the segment field is set to "0010" to indicate that only the STA STA3 uses the secondary segment. In the stream number indication field, bits indicating the transport stream numbers of the STAs STA1 and STA3 are set to "100", and bits indicating the transport stream numbers of the STAs STA2 and STA4 are set to "000", which means that the STAs STA2 and STA4 have no transport streams to be allocated. Therefore, since the STA STA3 of the STAs STA1 and STA3 to which transport streams are allocated uses the secondary segment, the STA STA1 uses the primary segment to transmit a frame. Accordingly, each of the STAs forming the group may recognize a packet to receive through the bit information of the segment field and the bit information of the stream number indication field.

FIG. 6A shows a case in which the STA STA1 transmits a frame by using eight transport streams through the primary segment and the STA STA3 transmits a frame by using four transport streams through the secondary segment.

Referring to FIG. 6B, a segment field is set to "0010" to indicate that only the STA STA3 uses the second segment. Furthermore, a stream number indication field is set to "100001001111" to satisfy the standard of the IEEE 802.11ac in which, when the number of STAs forming a group is four, the stream number indication field is expressed as 12 bits by using three bits for each STA. Accordingly, it can be seen that the STA STA3 using the secondary segment uses four transport streams through a value set to "0100". However, each of the other STAs STA1, STA2, and STA4 demodulates the secondary segment and then checks an address at a MAC level, thereby recognizing a packet of which the destination was set to the STA. Furthermore, a value of "1000" in the stream number indication field indicates that eight transport streams are used. The embodiment as shown in FIGS. 5A and 6A may not correspond to the MU-MIMO method in terms of the frequency band segments. Therefore, channel sounding does not need to be performed.

Figure 7:
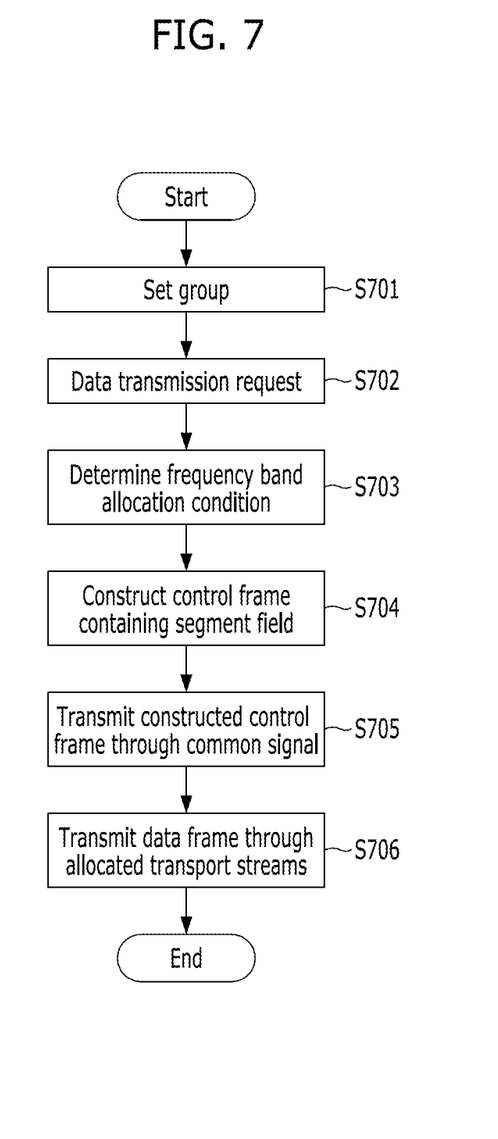
FIG. 7 is a diagram explaining a method for transmitting frames to multiple users in a wireless communication system using a plurality of frequency band segments in accordance with an embodiment of the present invention.

FIG. 7 is a diagram explaining a method for transmitting frames to multiple users in a wireless communication system using a plurality of frequency band segments in accordance with an embodiment of the present invention.

Referring to FIG. 7, a group setting process is performed at step S701. More specifically, an AP and STAs form a group through a sounding and group communication process, and a group ID is allocated to the group. The group formation process and the group ID allocation process are performed through an existing sounding process or the like.

After the group setting is completed, a data transmission request occurs at step S702. Then, the numbers of transport streams are decided by considering a data transmission amount, the ability of STAs, and whether to separately allocate frequency band segments to the STAs or to allocate all the frequency band segments to the STAs is determined at step S703.

Based on the determination result of the frequency band allocation condition, a control frame is constructed. Specifically, bits of a segment field and a stream number indication field indicating the numbers of transport streams allocated to the respective STAs are set in the control frame, at step S704. As described above, the segment field has a bit number corresponding to the order of the STAs within the group. Furthermore, when all the STAs within the group use all the frequency band segments without discrimination for the respective band segments, all the bits of the segment field are set to a first value, for example, "0". When the frequency band segments are separately allocated to the STAs, at least one bit of the segment field is set to a second value different from the first value, for example, "1". In this embodiment, the first value may be set to "1", and the second value may be set to "0". The stream number indication field indicating the transport stream numbers for the respective STAs may be set in various manners.

When the control frame is constructed in such a manner, the control frame is transmitted through a common signal at step S705. Then, data frame are transmitted through the transport streams allocated to the respective STAs by using the SU-MIMO or MU-MIMO method, at step S706.

Figure 8:
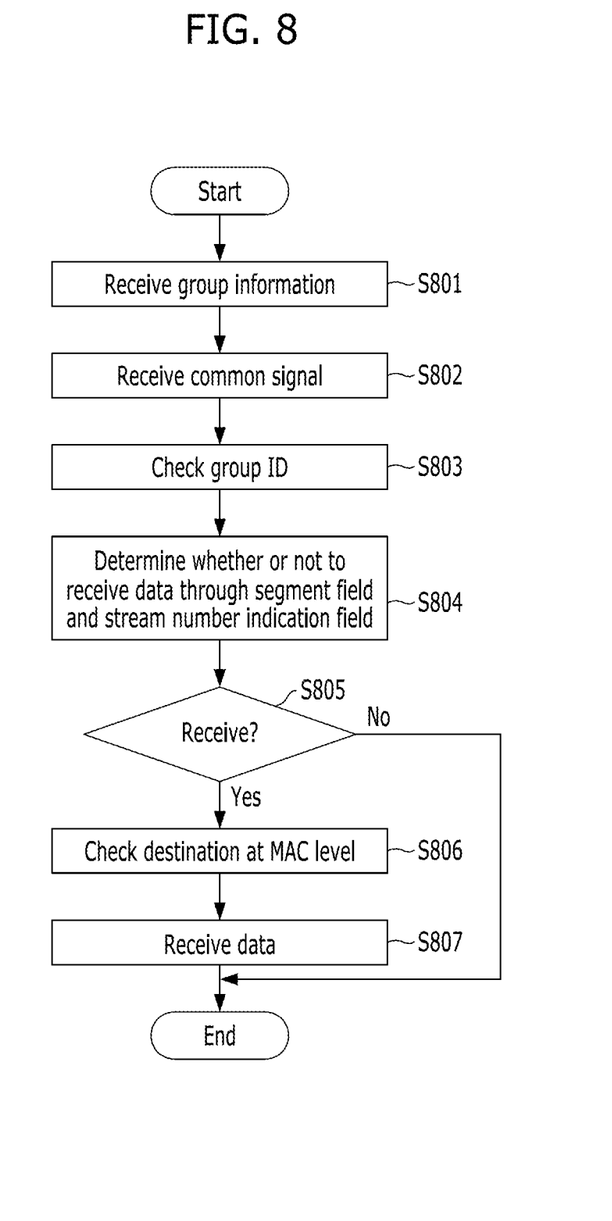
FIG. 8 is a diagram explaining a method for receiving frames transmitted to multiple STAs in a wireless communication system using a plurality of frequency band segments in accordance with another embodiment of the present invention.

FIG. 8 is a diagram explaining a method for receiving frames transmitted to multiple STAs in a wireless communication system using a plurality of frequency band segments in accordance with another embodiment of the present invention.

A group is set through a sounding and group communication process as described above, and group information and a variety of control information are then received at step S801. Through the information, each of the STAs may recognize a group ID of the group and the position of the STA within the group.

When the STA receives a common signal at step S802, the STA checks the group ID of the control frame contained in the common signal, and then determines whether or not a data frame is a signal of which the destination was set to the group of the STA, at step S803.

When the data frame is a signal of which the destination was set to the group of the STA, the STA determines whether or not the data frame is a signal of which the destination was set to the STA, through bits set in a segment field and bits set in a stream number indication field, at step S804. When determining that the data frame is not a signal of which the destination was set to the STA, the STA terminates the reception at step S805. However, when determining that the data frame is a signal of which the destination was set to the STA, the STA demodulates the received data frame, checks address information at the MAC level, and determines that the data frame is data of which the destination was set to the STA at step S806. Then, the STA receives the data of which the destination was set to the STA, at step S807.

In the above-described embodiments of the present invention, the down-link has been taken as an example. However, the embodiments of the present invention may be extended and applied to up-link. Furthermore, the wireless communication system based on the IEEE 802.11ac has been taken as an example in the above-described embodiments of the present invention. However, the embodiments of the present invention may be applied to a variety of systems based on the MU-MIMO technology.

In accordance with the embodiments of the present invention, even when STAs supporting all frequency band segments and STAs supporting only some frequency band segments are mixed in a wireless communication system using a plurality of frequency band segments, the other frequency band segments are not wasted. Furthermore, the STAs supporting all the frequency band segments and the STAs supporting only some frequency band segments are efficiently combined to apply the MU-MIMO. Accordingly, it is possible to efficiently utilize the frequency resource.

While the present invention has been described with respect to the specific embodiments, it will be apparent to those skilled in the art that various changes and modifications may be made without departing from the spirit and scope of the invention as defined in the following claims.

What is claimed is:

1. A method for transmitting data frames to multiple stations (STAs) in a wireless communication system that divides a frequency band into frequency band segments and allocates the frequency band segments to the STAs, the method comprising:
   setting a group by grouping a plurality of STAs;
   determining whether or not to separately allocate the frequency band segments to STAs within the group;
   constructing a control frame including a segment field, based on the determination result; and
   transmitting the control frame through a common signal, and then transmitting data frames,
   wherein the frequency band segments are separately allocated to the STAs within the group according to an ability of the STAs within the group, a data transmission amount, and a use state of the frequency band.

2. The method of claim 1, wherein the control frame comprises:
   the segment field for indicating whether each of the STAs within the group uses all the frequency band segments or the frequency band segments are separately allocated to the STAs within the group;
   a group ID corresponding to information on the group; and
   a stream number indication field indicating numbers of transport streams respectively allocated to the STAs within the group.

3. The method of claim 2, wherein the segment field includes bits corresponding to an order of the STAs within the group,
   wherein, if each of the STAs within the group uses all the frequency band segments, all the bits of the segment field are set to a first bit value, and
   wherein, if the frequency band segments are separately allocated to the STAs within the group, at least one bit of the segment field is set to a second bit value different from the first bit value.

4. The method of claim 3, wherein the bit values of the segment field indicate the frequency band segments that are allocated to the respective STAs within the group according to the order corresponding to the bits of the segment field.

5. A method for transmitting data frames to multiple STAs in a wireless communication system that divides a frequency band into frequency band segments and allocates the frequency band segments to the STAs, the method comprising:
   setting bits of a segment field, which indicate information on the frequency band segments allocated to STAs within a group, and constructing a control frame including the segment field; and
   transmitting the control frame through a common signal, and transmitting data frames,
   wherein the bits of the segment field correspond to an order of the STAs within the group,
   wherein, if each of the STAs within the group uses all the frequency band segments, all the bits of the segment field are set to a first bit value, and
   wherein, if the frequency band segments are separately allocated to the STAs within the group, at least one bit of the segment field is set to a second bit value different from the first bit value.

6. The method of claim 5, wherein the control frame further comprises:
a group ID corresponding to information on the group; and
a stream number indication field indicating numbers of transport streams respectively allocated to the STAs within the group.

7. The method of claim 5, wherein the bit values of the segment field indicate the frequency band segments that are allocated to the respective STAs within the group according to the order corresponding to the bits of the segment field.

8. The method of claim 5, wherein the frequency band segments are separately allocated to the STAs within the group according to the ability of the STAs within the group, a data transmission amount, and a use state of the frequency band.

9. A method for receiving data frames transmitted to multiple STAs in a wireless communication system that divides a frequency band into frequency band segments and allocates the frequency band segments to the STAs, the method comprising:
receiving, by an STA, group information and a common signal;
determining, by the STA, whether a data frame to be transmitted corresponds to a group to which the STA belongs using a group ID included in the common signal;
if the data frame to be transmitted is determined to correspond to the group of the STA, checking, by the STA, a frequency band segment allocated to each of STAs within the group by using bit information of a segment field included in the common signal; and
receiving, by the STA, a transmitted data frame through a frequency band segment allocated to the STA,
wherein the bit information of the segment field indicates whether each of the STAs within the group uses all the frequency band segments or the frequency band segments are separately allocated to the STAs within the group,
wherein the bit information includes bits corresponding to the STAs within the group,
wherein, if each of the STAs within the group uses all the frequency band segments, all the bits of the segment field are set to a first bit value, and
wherein, if the frequency band segments are separately allocated to the STAs within the group, at least one bit of the segment field is set to a second bit value different from the first bit value.

10. The method of claim 9, wherein, checking the frequency band segment allocated to each of the STAs within the group comprises, if the data frame to be transmitted corresponds to the group of the STA, determining whether or not the data frame to be transmitted is a signal whose destination is the STA using the bit information of the segment field for indicating the frequency band segments allocated to the STAs within the group and bit information of a stream number indication field indicating numbers of transport streams respectively allocated to the STAs within the group, the stream number indication field being included in the common signal.

11. The method of claim 9, wherein the bit values of the segment field indicate the frequency band segments that are allocated to the respective STAs within the group according to the order corresponding to the bits of the segment field.

12. The method of claim 9, wherein the frequency band segments are separately allocated to the STAs within the group according to the ability of the STAs within the group, a data transmission amount, and a use state of the frequency band.

* * * * *